United States Patent

[11] 3,543,820

| [72] | Inventor | Michael Tulumello<br>Buffalo, New York |
|---|---|---|
| [21] | Appl. No. | 765,354 |
| [22] | Filed | Oct. 7, 1968 |
| [45] | Patented | Dec. 1, 1970 |
| [73] | Assignee | Joseph Panzarella<br>Buffalo, New York<br>a part interest in |

[54] ROSETTE CUTTING BIT
8 Claims, 7 Drawing Figs.

[52] U.S. Cl..................................................... 144/219;
145/116
[51] Int. Cl..................................................... B27g 13/12
[50] Field of Search........................................... 144/219,
218, 134, 150, 14; 145/116, 121

[56] References Cited
UNITED STATES PATENTS

| 386,710 | 7/1888 | Kittle | 144/219X |
| 528,725 | 11/1894 | Hussey | 144/219 |
| 615,251 | 12/1898 | Cooper | 144/219 |
| 2,689,131 | 9/1954 | Priest | 145/116X |
| 2,731,990 | 1/1956 | Cerkleski | 144/219X |

*Primary Examiner*—Gil Weidenfeld
*Attorney*—Sommer, Weber & Gastel

ABSTRACT: A rosette cutting bit including a substantially flat head having a configurated front edge surface cut away to form a forwardly projecting central pilot portion terminating in a transverse pilot cutting edge extending across the central longitudinal rotational axis and connecting oppositely facing leading faces, and to form on opposite sides of such pilot edge substantially identical configurated working faces each inclined forwardly from each trailing face to form with the opposite leading face a substantially continuous leading cutting edge extending outwardly from its juncture with such pilot edge.

Patented Dec. 1, 1970
3,543,820
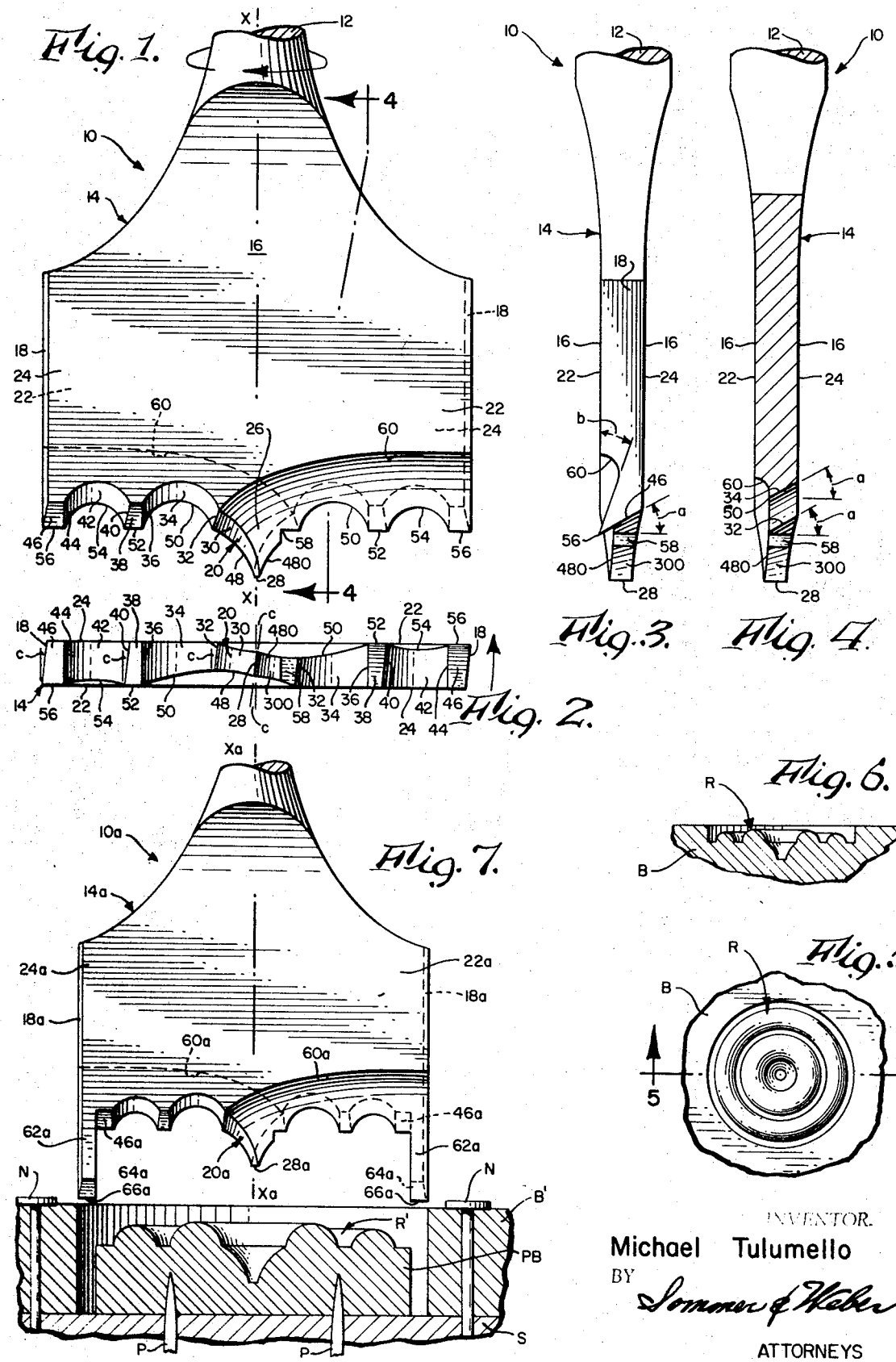
INVENTOR.
Michael Tulumello
BY
ATTORNEYS 3,543,820

ROSETTE CUTTING BIT

BACKGROUND OF THE INVENTION

1. Field of the Invention

The present invention relates to improvements in rosette cutting tools and more particularly to a new and improved bit which is adapted to rotate about a central longitudinal axis in one direction for cutting a rosette in the face of a block of wood or plastic in a single operation.

2. Description of the Prior Art

While a number and variety of rosette cutting tools are available, the they usually suffer from one or more of the following disadvantages. First, some are unable to cut a rosette in a single operation, but require both a roughing and finishing tool. Secondly, some are relatively expensive to manufacture and maintain because they are composed of several separate elements which which must be assembled together, such as a central pilot or drill member, cutting blades, blade holding devices and machined heads on which such blades and their holding devices are mounted. Thirdly, some are designed to cut only on one side of the axis of rotation, while others do not cut in the same manner on opposite sides of such axis, either of which conditions creates imbalance in rotation and uneven cutting action, often resulting in nonuniformity of the rosette being formed.

SUMMARY OF THE INVENTION

Accordingly, it is a primary object of the present invention to provide a new and improved rosette cutter which is not only capable of cutting a rosette in a single operation, but also relatively inexpensive to manufacture and maintain, and which produces a uniform rosette. To this end, the inventive bit includes an enlarged and unitary cutting head of radially elongated, generally rectangular cross section and having two opposite and substantially flat major surfaces terminating in substantially flat side edge surfaces and axially forwardly in a configurated front edge surface. Each major surface is divided generally along the central longitudinal axis of rotation into a leading face and a trailing face, with the leading and trailing faces of one major surface being substantially identical to but offset radially from and facing in the opposite directions as the leading and trailing faces respectively of the opposite major surface. The configurated front edge surface is cut away not only to form a forwardly projecting pilot portion terminating in a transverse pilot cutting edge extending across such axis and connecting such leading faces, but also to form on opposite sides of such pilot edge substantially identical configurated working faces, each inclined from each trailing face to form with the opposite leading face a substantially continuous leading cutting edge extending outwardly from its juncture with such pilot edge.

Thus, the unitary construction of the cutting head, including the pilot and cutting portions thereof, not only simplifies manufacture and maintenance but also substantially reduces the cost thereof. Moreover, the symmetry and continuity of the working faces and cutting edges on opposite sides of the central pilot cutting edge and rotational axis not only facilitate cutting the rosette in a single operation but also produce balanced rotation and even cutting action resulting in uniform rosettes.

Another object is to provide a new and improved rosette cutter which also is adapted to cut through the block as the rosette is being formed in the face thereof.

Additional objects and advantages of the invention will become apparent upon consideration of the following detailed description and drawing.

BRIEF DESCRIPTION OF THE DRAWING

FIG. 1 is a side elevational view on an enlarged scale of a rosette cutting bit constituting a preferred embodiment of the invention.

FIG. 2 is a bottom plan view thereof.

FIG. 3 is a right edge elevational view thereof.

FIG. 4 is a vertical sectional view taken on line 4-4 of FIG. 1.

FIG. 5 is a partial top plan view on a reduced scale of a block and a rosette cut in the top face thereof by the inventive embodiment of FIGS. 1—4.

FIG. 6 is a fragmentary sectional view taken on line 6-6 of FIG. 5 and illustrating the profile of the rosette.

FIG. 7 is a side elevational view similar to FIG. 1, but on a slightly smaller scale, and illustrating a modified embodiment adapted to cut through a block as the rosette is being formed.

DESCRIPTION OF THE PREFERRED EMBODIMENT

Referring to the drawing, and particularly FIGS. 1—4, a preferred embodiment of the inventive rosette cutting bit is generally indicated at 10. The bit is made of suitable cutting tool steel in one piece, and includes an elongated, generally cylindrical, solid shank portion 12, only the lower portion of which is shown as merging with an integral and enlarged, unitary flattened cutting head 14. The shank 12 is adapted to be held in a suitable chuck (not shown) in order to drive head 14 about central longitudinal axis X-X in one direction, as indicated by the arrows in FIGS. 1 and 2.

Head 14, as best seen in FIG. 2, if of radially elongated generally rectangular cross section and has two opposite and substantially flat, upright major surfaces 16 (FIGS. 1, 3 and 4) which terminate radially outwardly in substantially flat, upright side edge surfaces 18 and axially forwardly in a lower configured front edge surface generally indicated at 20. Each of major surfaces 16 is divided generally along axis X-X into a leading face 22 and a trailing face 24, with the leading and trailing faces of one major surface being substantially identical to, but offset radially from and facing in the opposite directions as the leading and trailing faces respectively of the opposite major surface. Thus, as seen in FIG. 1, on the visible major surface 16, leading face 22 appears on the right of axis X-X while trailing face 24 appears on the left thereof. The reverse is true of the opposite major surface.

Front edge surface 20 is easily cut away, as by grinding, to form not only a forwardly projecting central pilot portion 26 terminating in a transverse pilot cutting edge 28 extending across axis X-X and connecting opposite leading faces 22, but also on opposite sides of pilot edge 28 substantially identical configurated working faces, each composed of the following face portions. Taking the working face to the left of axis X-X, it includes a concave pilot face portion 30 curving outwardly and rearwardly from pilot edge 28 toward and to a first transverse edge 32, an inner concave and generally semicylindrical, scallop face portion 34 curving outwardly and rearwardly from edge 32 and then outwardly and forwardly to a second transverse edge 36, an inner and substantially flat, land face portion 38 extending radially outwardly radially from edge 36 to a third transverse edge 40, an outer concave and generally cylindrical scallop face portion 42 of slightly smaller diameter than scallop face portion 34, but also curving outwardly and rearwardly from edge 40 and then outwardly and forwardly to a fourth transverse edge 44, and finally an outer substantially flat land face portion 46 extending radially outwardly from edge 44 to its juncture with side edge 18. Substantially identical working face structure is provided to the right of axis X-X, except for pilot face portion 300 which is interrupted, for a purpose to be described below, as it curves outwardly and rearwardly toward innermost transverse edge 32.

As is evident from FIGS. 1, 3 and 4, each of the working faces of front edge surface 20 and the various portions thereof are inclined axially forwardly from each trailing face 24 to form with the opposite leading face 22 a substantially continuous leading cutting edge extending rearwardly and outwardly from its juncture with pilot edge 28, thereby providing positive front rake or clearance for such cutting edge. Of course, in view of the offset relation of the leading and trailing faces 22, 24 on opposite sides of axis X-X, the portions of each working face incline oppositely to the corresponding portions of the other working face. While the positive front rake angle *a* of each working face may vary, depending upon the type of wooden or plastic material being cut, the preferred angle for cutting wood is shown as about 30°, and it also is preferred that the angle be the same for the land and scallop face portions.

Each working face portion forms at its juncture with each leading face 22 a portion of the substantially continuous cutting edge, and as shown in FIGS. 1 and 2, leading outwardly from axis X-X on each side thereof, the pilot leading edge portion is designated at 48 (on the left) or 480 (on the right), the inner scallop leading edge portion as 50, the inner land leading edge portion as 52, the outer scallop leading edge portion as 54, and the outer land leading edge portion as 56. As noted above, pilot face portion 300 and its corresponding leading cutting edge portion 480 are interrupted intermediate pilot edge 28 and inner scallop face portion 34 to provide a notch 58. This notch preferably is included to furnish relief for the starting cut, but could be omitted if desired.

As best seen in FIGS. 1, 3 and 4, in order to provide positive lead rake or clearance, each leading face 22 is cut away along each leading edge to form a chip removal groove 60, which increases in both width and depth from each trailing face 24 to each side edge surface 18. Actually, each groove 60 is shown as extending beyond axis X-X to a juncture with pilot face portion 30 or 300 for convenience in grinding the groove. However, groove 60 could terminate at axis X-X if desired.

As will be apparent from FIGS. 3 and 4, the lead rake or clearance angle formed by groove 60 gradually increases with the width and depth of the groove toward the adjacent side edge surface 18 to form an angle *b* therewith, as shown in FIG. 3. While this angle may vary as desired, the preferred angle for cutting wood is shown as about 20°.

In order to provide positive side rake or clearance, it is to be noted that each side edge surface 18 and each first and third transverse edge 32, 40 are inclined radially outwardly from each trailing face 24 to the opposite leading face 22, as best shown in FIG. 2. In addition, pilot edge 28 is inclined across axis X-X and outwardly therefrom to each leading face 22, also to provide such side clearance and to assist in the starting cut. While such side clearance or rake angle may vary as desired, the preferred angle *c* for cutting wood is shown as about 7°.

In addition, in order to produce the preferred profile of rosette R in block B as shown in FIG. 6, pilot cutting edge 28 preferably lies in a radial plane substantially perpendicular to axis X-X, while the portions of each leading cutting edge formed by land edge portions 52, 56 and the point juncture of leading face 22 and innermost transverse edge 32 all lie in substantially the same radial plane, which also is perpendicular to axis X-X but offset rearwardly from the plane of pilot edge 28. The location of pilot edge 28 and such leading cutting edge portions in such perpendicular radial planes also helps to balance the rotation of cutter head 14 for controlling both the profile and plan of rosette R.

From the above description of the preferred embodiment of FIGS. 1—4, it is evident that the unitary construction of cutter head 14, including the pilot and cutting portions thereof, facilitates grinding of the pilot and cutting edges to produce an economical bit which is easy to manufacture and maintain. In addition, it is apparent that the symmetry and continuity of the cutting edges and working faces on opposite sides of pilot edge 28 and axis X-X not only permit cutting of rosette R in a single operation, but also produce balanced rotation of the bit and even cutting action resulting in a rosette of uniform plan and profile, as shown in FIGS. 5 and 6.

A modified embodiment of the inventive bit is illustrated in FIG. 7 and is indicated generally at 10*a*. The various components and surfaces of the embodiment which correspond to those of the embodiment shown in FIGS. 1—4 are indicated by the same numerals, but with the suffix *a*. Thus, a detailed description of such corresponding elements is not necessary, and only the variations in structure will be referred to.

The purpose of modified embodiment 10*a* is to provide a device which will cut through block B' simultaneously with the formation of rosette R' to form a circular plinth block PB or the like having the rosette therein. Block B' is shown in FIG. 7 as being held in position on a suitable support S by any suitable means such as nails N or the like and the cutout portion of such block forming plinth block PB also is held in place on support S by any suitable means such as pins P or the like.

To this end, cutting head 14*a* is extended both radially outwardly and axially forwardly while front edge surface 20*a* is cut away to form on each side of axis X*a*—X*a* an elongated arm 62*a* which is arranged radially outwardly of each outer land face portion 46*a* and extending forwardly therefrom and beyond pilot edge 28*a*. Each arm 62*a* is provided with a working face 64*a* inclined forwardly from each trailing face 24*a* to provide the desired positive front rake or clearance and to form with the opposite leading face 22*a* a cutoff edge 66*a* extending radially outwardly to each side edge surface 18*a* in a third radial plane substantially parallel to but offset forwardly beyond the plane of pilot edge 28*a* a sufficient distance to cut through block B'.

Just as in the embodiment of FIGS. 1—4, the various positive front, side and lead rake or clearance angles are formed for the same purposes, with groove 60*a* also being cut away from leading cutoff edge 66*a* which is located in the aforesaid radial plane to provide the desired balanced rotation and uniform cutting action.

It not will be seen how the invention accomplishes its various objects, and numerous advantages thereof also will be apparent. While the invention has been described and illustrated herein by reference to two embodiments, it is to be understood that various changes and modifications may be made therein by those skilled in the art without departing from the inventive concept, the scope of which is to be determined by the appended claims.

I claim:

1. A bit adapted to rotate about a central longitudinal axis in one direction for cutting a rosette in the face of a block in a single operation and comprising: an enlarged and unitary cutting head of radially enlongated, generally rectangular cross section and having two opposite and substantially flat major surfaces terminating radially in side edge surfaces and axially forwardly in a configurated front edge surface, each of said major surfaces being divided generally along said axis into a leading face and a trailing face, with the leading and trailing faces of one major surface being substantially identical to, but offset radially from and facing in the opposite direction as the leading and trailing faces respectively of the opposite major surface, said front edge surface being cut away to form not only a forwardly projecting central pilot portion terminating in a transverse pilot cutting edge extending across said axis and connecting said leading faces, but also on opposite sides of said pilot edge substantially identical configurated working faces, each being inclined forwardly from each trailing face to provide positive front rake and to form with the opposite leading face a substantially continuous leading cutting edge extending outwardly from its juncture with said pilot edge, each leading face being cut away along each leading edge to form a chip removal groove increasing in both width and depth from each trailing face to each side edge surface and providing positive lead rake.

2. The bit of claim 1 wherein each side edge surface is inclined outwardly from each trailing face to the opposite leading face and said pilot edge is inclined outwardly from said axis to each leading face, in order to provide positive side rake.

3. The bit of claim 1 wherein each working face includes a concave pilot face portion curving outwardly and rearwardly from said pilot edge toward a first transverse edge, an inner concave scallop face portion curving outwardly and rearwardly from said first transverse edge and then outwardly and forwardly to a second transverse edge, an inner substantially flat land face portion extending outwardly from said second transverse edge to a third transverse edge, an outer concave scallop face portion curving outwardly and rearwardly from said third transverse edge and then outwardly and forwardly to a fourth transverse edge, and an outer substantially flat land face portion extending outwardly from said fourth transverse edge.

4. The bit of claim 3 wherein each side edge surface and each first and third transverse edge are inclined outwardly from each trailing face to the opposite leading face and said pilot edge is inclined outwardly from said axis to each leading face, thereby providing positive side rake.

5. The bit of claim 4 wherein one of said pilot face portions is notched intermediate said pilot edge and inner scallop face portion to provide relief for a starting cut.

6. The bit of claim 4 wherein said pilot edge lies in a first radial plane substantially perpendicular to said axis, and the portions of each leading edge formed by each leading face with each of said first transverse edges and inner and outer land face portions lie in a second radial plane substantially perpendicular to said axis but offset rearwardly of said first plane.

7. The bit of claim 6 wherein each outer land face portion extends outwardly to the corresponding side edge surface.

8. The bit of claim 6 wherein said front edge surface is cut away to form on each side of said axis an elongated arm arranged outwardly of each outer land face portion and extending forwardly therefrom and beyond said pilot edge, each arm having a working face inclined forwardly from each trailing face to provide positive front rake and to form with the opposite leading face a cutoff edge extending outwardly to each side edge surface in a third radial plane substantially parallel to but offset forwardly beyond said first plane a sufficient distance to cut through said block.